United States Patent
Stubblefield et al.

(10) Patent No.: US 10,759,914 B2
(45) Date of Patent: Sep. 1, 2020

(54) TIRE THREAD WITH LOW TG RUBBER

(71) Applicants: Compagnie Generale des Etablissements Michelin, Clermont-Ferrand (FR); Raymond Stubblefield, Greenville, SC (US); Olivier Piffard, Mauldin, SC (US)

(72) Inventors: Raymond Stubblefield, Greenville, SC (US); Olivier Piffard, Mauldin, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 16/067,063

(22) PCT Filed: Dec. 23, 2016

(86) PCT No.: PCT/US2016/068543
§ 371 (c)(1),
(2) Date: Jun. 28, 2018

(87) PCT Pub. No.: WO2017/117056
PCT Pub. Date: Jul. 6, 2017

(65) Prior Publication Data
US 2019/0002653 A1 Jan. 3, 2019

Related U.S. Application Data

(60) Provisional application No. 62/273,965, filed on Dec. 31, 2015.

(51) Int. Cl.
*C08L 9/00* (2006.01)
*C08J 5/00* (2006.01)
*B60C 1/00* (2006.01)
*C08L 9/06* (2006.01)

(52) U.S. Cl.
CPC ............. *C08J 5/005* (2013.01); *B60C 1/0016* (2013.01); *C08L 9/06* (2013.01); *C08J 2309/06* (2013.01); *C08L 2205/06* (2013.01); *C08L 2312/00* (2013.01)

(58) Field of Classification Search
CPC ... C08L 9/06; C08L 9/00; C08L 57/02; C08K 3/36; C08K 3/04; B60C 1/0016; C08J 5/005; C08J 2309/06; C08J 2205/06; C08J 2312/00
See application file for complete search history.

(56) References Cited

U.S. PATENT DOCUMENTS

| | | | |
|---|---|---|---|
| 2015/0087745 A1 | 3/2015 | Chekanov et al. | |
| 2015/0283854 A1* | 10/2015 | Saintigny et al. | .... B60C 1/0016 524/313 |
| 2017/0361658 A1* | 12/2017 | Sanders et al. | ....... B60C 1/0016 |

OTHER PUBLICATIONS

International Search Report and Written Opinion, dated Mar. 29, 2017.

* cited by examiner

*Primary Examiner* — Nathan M Nutter
(74) *Attorney, Agent, or Firm* — John Steckler Schwab

(57) ABSTRACT

Rubber compositions and articles made such rubber compositions having at least 80 phr of a styrene-butadiene elastomer modified with a functional group that is capable of interacting with a silica reinforcing filler and having a glass transition temperature of between −60° C. and less than −40° C. The rubber compositions may also include an effective amount of a plasticizing system having a plasticizing resin and a plasticizing liquid, wherein the effective amount of the plasticizing system provides the rubber composition with a shear modulus G* measured at 60° C. of between 0.9 MPa and 1.5 MPa and a Tg of between −35° C. and −15°. The filler for the rubber compositions is silica and there is further a curing system.

20 Claims, No Drawings

TIRE THREAD WITH LOW TG RUBBER

BACKGROUND OF THE INVENTION

Field of the Invention

This invention relates generally to rubber compositions and more particularly to rubber compositions having a low glass transition temperature useful for tire treads and other articles.

Description of the Related Art

It is known in the industry that tire designers must often compromise on certain characteristics of the tires they are designing. Changing a tire design to improve one characteristic of the tire will often result in a compromise; i.e., an offsetting decline in another tire characteristic. One such comprise exists between the rolling resistance of the tire and wet/dry braking and wear performance. For example, it is known that one can lower the reinforcement filler content in a rubber composition tom improve the rolling resistance but that also leads to a reduction in the wear and wet/dry braking performance. Tire wear may be improved by increasing the amount of polybutadiene blended into the tread's rubber composition. However, increasing the polybutadiene content in the tread's rubber composition typically results in a loss of the wet braking performance that is known to be improved, for example, by decreasing the polybutadiene content of the tire tread.

It is important to reduce the rolling resistance of a tire because it saves energy and results in lower fuel bills and less gasoline consumption. Of course consumers also want to have tires that can go further and therefore they are interested in improved wear. Likewise it is necessary that tires have good braking characteristics.

Tire designers and those conducting research in the tire industry search for materials and tire structures that can break some of the known compromises. It would be desirable to provide new tire designs that break the compromise between these desired tire performance characteristics.

SUMMARY OF THE INVENTION

Particular embodiments of the present invention include rubber compositions and articles made therefrom including, for example, tires and tire components such as tire treads. Embodiments of treads may include, for example, tire treads comprising a rubber composition that is based upon a cross-linkable elastomer composition. Such cross-linkable rubber compositions may include at least 80 phr of a styrene-butadiene elastomer modified with a functional group that is capable of interacting with a silica reinforcing filler and having a glass transition temperature of between −60° C. and less than −40° C. as well as between 0 phr and 20 phr of an additional highly unsaturated diene elastomer.

Such rubber compositions may further include an effective amount of a plasticizing system that includes a plasticizing resin having a glass transition temperature (Tg) of at least 25° C. and a plasticizing liquid, wherein the effective amount of the plasticizing system provides the rubber composition with a shear modulus G* measured at 60° C. of between 0.9 MPa and 1.5 MPa and a Tg of between −35° C. and −15°. The filler for the rubber compositions is silica and there is further a curing system.

DETAILED DESCRIPTION OF PARTICULAR EMBODIMENTS

Particular embodiments of the inventions disclosed herein include rubber compositions and articles that are made from such rubber compositions, including tires and tire components such as tire treads. Using the disclosed rubber compositions can provide tires having treads with improved dry and wet traction, improved snow traction and/or improved rolling resistance.

These compromises were broken using a unique rubber composition that included a functionalized SBR having a low glass transition temperature coupled with an effective amount of a plasticizing system that was used to adjust the glass transition temperature of the rubber composition and its complex shear modulus G* at 60° C.

As used herein, "phr" is "parts per hundred parts of rubber" by weight and is a common measurement in the art wherein components of a rubber composition are measured relative to the total weight of rubber in the composition, i.e., parts by weight of the component per 100 parts by weight of the total rubber(s) in the composition.

As used herein, rubber and elastomer are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As is known generally, a tire tread is the road-contacting portion of a vehicle tire that extends circumferentially about the tire. It is designed to provide the handling characteristics required by the vehicle; e.g., traction, dry braking, wet braking, cornering and so forth—all being preferably provided with a minimum amount of noise being generated and at a low rolling resistance.

Treads of the type that are disclosed herein include tread elements that are the structural features of the tread that contact the ground. Such structural features may be of any type or shape, examples of which include tread blocks and tread ribs. Tread blocks have a perimeter defined by one or more grooves that create an isolated structure in the tread while a rib runs substantially in the longitudinal (circumferential) direction and is not interrupted by any grooves that run in the substantially lateral direction or any other grooves that are oblique thereto.

The radially outermost faces of these tread elements make up the contact surface of the tire tread—the actual surface area of the tire tread that is adapted for making contact with the road as the tire rotates. The total contact surface of the tire tread is therefore the total surface area of all the radially outermost faces of the tread elements that are adapted for making contact with the road.

Suitable compositions for making treads and tires and other articles as disclosed herein include a styrene-butadiene rubber that has been modified with a functional group that is capable of interacting with a silica reinforcing filler. As is known, SBR is a copolymer of styrene and 1, 3-butadiene and is one of the most commonly used synthetic rubbers. The microstructure of SBR is typically described in terms of the amount of bound styrene and the form of the butadiene portion of the polymer. A typical SBR that is often suitable for use in tires is around 25 wt. % bound styrene. Materials having a very high content of bound styrene, e.g., around 80 wt. %, are identified as high styrene resins and are not suitable as an elastomer for manufacturing treads. Particular embodiments of the present invention may utilize an SBR having a bound styrene content of between 3 wt % and 40 wt % or alternatively between 10 wt % and 40 wt %, between 15 wt % and 35 wt. % or between 20 wt % and 30 wt % bound styrene.

Because of the double bond present in the butadiene portion of the SBR, the butadiene portion is made up of three forms: cis-1,4, trans-1,4 and vinyl-1,2. Optionally the functionalized SBR materials suitable for use in the rubber compositions disclosed herein are those having a relatively low vinyl-1,2 content such as less than 35% or alternatively less than 30%.

Methods for determining the microstructure of the butadiene portion of the SBR materials are well known to those having ordinary skill in the art and include, for example, NMR methods and infrared spectroscopy methods. In one suitable NMR spectroscopy method, a carbon-13 NMR analyses may be performed using, for example, a Bruker AM250 spectrometer. The nominal frequency of carbon-13 is 62.9 MHz and the spectra are recorded without the "nuclear Overhauser effect" (NOE) to ensure quantitative results. The spectral width is 240 ppm. The angle pulse used is a 90° pulse, the duration of which is 5 μs. Low-power decoupling with a wide proton band are used to eliminate scalar $^1$H-carbon-13 coupling during carbon-13 acquisition. The sequence repetition time is 4 seconds. The number of transients accumulated to increase the signal/noise ratio is 8192. The spectra are calibrated against the $CDCl_3$ band at 77 ppm.

Additionally the modified SBR's that are suitable for particular embodiments of the rubber compositions disclosed herein may be described as having a glass transition temperature of no greater than −40° C. or alternatively between −60° C. and −40° C. or between greater than −50° C. and −40° C. Glass transition temperatures for the modified elastomers are determined by differential scanning calorimetry (DSC) according to ASTM E1356.

Functionalized rubbers, i.e., those appended with active moieties, are well known in the industry. The elastomers may be functionalized by attaching these active moieties to the polymer backbone, along the branches of the polymer or at the branch ends of the polymer. Examples of functionalized elastomers include silanol or polysiloxane functionalized elastomers, examples of which may be found in U.S. Pat. No. 6,013,718, which is hereby fully incorporated by reference. Other examples of functionalized elastomers include those having alkoxysilane groups as described in U.S. Pat. No. 5,977,238, carboxylic groups as described in U.S. Pat. No. 6,815,473, polyether groups as described in U.S. Pat. No. 6,503,973 or amino groups as described in U.S. Pat. No. 6,800,582 and are all incorporated herein by reference. The functional groups are attached to the elastomers to provide interaction between the elastomer and the reinforcement filler.

In particular embodiments of the treads disclosed herein, the SBR is a functionalized elastomer having functional moieties attached to at least a portion of the total number of branch ends or along the branches of the butadiene portion of the polymer. Such functional moieties may include, for example, amino groups, silanol groups, alkoxysilane groups, carboxylic groups or polyether groups. In particular embodiments, the functional moieties may be selected from amino groups, silanol groups or alkoxysilane groups. In particular embodiments, the functionalized SBR may include a mixture of two or more different such functionalized SBR's or limited to one of the functionalized SBR's.

The rubber compositions disclosed herein may include at least 80 phr of the modified SBR or alternatively between 90 phr and 100 phr or the rubber composition may include 100 phr of the modified SBR.

In addition to the rubber components described above, the rubber composition suitable for the tire treads disclosed herein may further include a plasticizing system. The plasticizing system provides both an improvement to the processability of the rubber mix and a means for adjusting the rubber composition's dynamic shear modulus and glass transition temperature. Suitable plasticizing systems include both a plasticizing liquid and a plasticizing resin to achieve the desired braking and snow traction characteristics of the tread.

Suitable plasticizing liquids may include any liquid known for its plasticizing properties with diene elastomers. At room temperature (23° C.), these liquid plasticizers or these oils of varying viscosity are liquid as opposed to the resins that are solid. Examples include those derived from petroleum stocks, those having a vegetable base and combinations thereof. Examples of oils that are petroleum based include aromatic oils, paraffinic oils, naphthenic oils, MES oils, TDAE oils and so forth as known in the industry. Also known are liquid diene polymers, the polyolefin oils, ether plasticizers, ester plasticizers, phosphate plasticizers, sulfonate plasticizers and combinations of liquid plasticizers.

Examples of suitable vegetable oils include sunflower oil, soybean oil, safflower oil, corn oil, linseed oil and cotton seed oil. These oils and other such vegetable oils may be used singularly or in combination. In some embodiments, sunflower oil having a high oleic acid content (at least 70 weight percent or alternatively, at least 80 weight percent) is useful, an example being AGRI-PURE 80, available from Cargill with offices in Minneapolis, Minn. In particular embodiments of the present invention, the selection of suitable plasticizing oils is limited to a vegetable oil having high oleic acid content.

The amount of plasticizing liquid useful in any particular embodiment of the present invention depends upon the particular circumstances and the desired result. In general, for example, the plasticizing liquid may be present in the rubber composition in an amount of between 1 phr and 50 phr or alternatively, between 3 phr and 40 phr, between 5 phr and 35 phr, between 5 phr and 30 phr, between 3 phr and 20 phr or between 3 phr and 15 phr of the plasticizing liquid. Since both a plasticizing liquid and a plasticizing hydrocarbon resin are included in the plasticizing system, the amount of both types of plasticizers is adjusted as described below to obtain the desired physical characteristics of the tread.

A plasticizing hydrocarbon resin is a hydrocarbon compound that is solid at ambient temperature (e.g., 23° C.) as opposed to liquid plasticizing compounds, such as plasticizing oils. Additionally a plasticizing hydrocarbon resin is compatible, i.e., miscible, with the rubber composition with which the resin is mixed at a concentration that allows the resin to act as a true plasticizing agent, e.g., at a concentration that is typically at least 5 phr.

Plasticizing hydrocarbon resins are polymers/oligomers that can be aliphatic, aromatic or combinations of these types, meaning that the polymeric base of the resin may be formed from aliphatic and/or aromatic monomers. These resins can be natural or synthetic materials and can be petroleum based, in which case the resins may be called petroleum plasticizing resins, or based on plant materials. In particular embodiments, although not limiting the invention, these resins may contain essentially only hydrogen and carbon atoms.

The plasticizing hydrocarbon resins useful in particular embodiment of the present invention include those that are homopolymers or copolymers of cyclopentadiene (CPD) or dicyclopentadiene (DCPD), homopolymers or copolymers of terpene, homopolymers or copolymers of $C_5$ cut and mixtures thereof.

Such copolymer plasticizing hydrocarbon resins as discussed generally above may include, for example, resins made up of copolymers of (D)CPD/vinyl-aromatic, of (D)CPD/terpene, of (D)CPD/$C_5$ cut, of terpene/vinyl-aromatic, of $C_5$ cut/vinyl-aromatic and of combinations thereof.

Terpene monomers useful for the terpene homopolymer and copolymer resins include alpha-pinene, beta-pinene and limonene. Particular embodiments include polymers of the limonene monomers that include three isomers: the L-limonene (laevorotatory enantiomer), the D-limonene (dextrorotatory enantiomer), or even the dipentene, a racemic mixture of the dextrorotatory and laevorotatory enantiomers.

Examples of vinyl aromatic monomers include styrene, alpha-methylstyrene, ortho-, meta-, para-methylstyrene, vinyl-toluene, para-tertiobutylstyrene, methoxystyrenes, chloro-styrenes, vinyl-mesitylene, divinylbenzene, vinyl-naphthalene, any vinyl-aromatic monomer coming from the $C_9$ cut (or, more generally, from a $C_8$ to $C_{10}$ cut). Particular embodiments that include a vinyl-aromatic copolymer include the vinyl-aromatic in the minority monomer, expressed in molar fraction, in the copolymer.

Particular embodiments of the present invention include as the plasticizing hydrocarbon resin the (D)CPD homopolymer resins, the (D)CPD/styrene copolymer resins, the polylimonene resins, the limonene/styrene copolymer resins, the limonene/D(CPD) copolymer resins, $C_5$ cut/styrene copolymer resins, $C_5$ Cut/$C_9$ cut copolymer resins, and mixtures thereof.

Commercially available plasticizing resins that include terpene resins suitable for use in the present invention include a polyalphapinene resin marketed under the name Resin R2495 by Hercules Inc. of Wilmington, Del. Resin R2495 has a molecular weight of about 932, a softening point of about 135° C. and a glass transition temperature of about 91° C. Another commercially available product that may be used in the present invention includes DERCOLYTE L120 sold by the company DRT of France. DERCOLYTE L120 polyterpene-limonene resin has a number average molecular weight of about 625, a weight average molecular weight of about 1010, an Ip of about 1.6, a softening point of about 119° C. and has a glass transition temperature of about 72° C. Still another commercially available terpene resin that may be used in the present invention includes SYLVARES TR 7125 and/or SYLVARES TR 5147 polylimonene resin sold by the Arizona Chemical Company of Jacksonville, Fla. SYLVARES 7125 polylimonene resin has a molecular weight of about 1090, has a softening point of about 125° C., and has a glass transition temperature of about 73° C. while the SYLVARES TR 5147 has a molecular weight of about 945, a softening point of about 120° C. and has a glass transition temperature of about 71° C.

Other suitable plasticizing hydrocarbon resins that are commercially available include $C_5$ cut/vinyl-aromatic styrene copolymer, notably $C_5$ cut/styrene or $C_5$ cut/$C_9$ cut from Neville Chemical Company under the names SUPER NEVTAC 78, SUPER NEVTAC 85 and SUPER NEVTAC 99; from Goodyear Chemicals under the name WINGTACK EXTRA; from Kolon under names HIKOREZ T1095 and HIKOREZ T1100; and from Exxon under names ESCOREZ 2101 and ECR 373.

Yet other suitable plasticizing hydrocarbon resins that are limonene/styrene copolymer resins that are commercially available include DERCOLYTE TS 105 from DRT of France; and from Arizona Chemical Company under the name ZT115LT and ZT5100.

It may be noted that the glass transition temperatures of plasticizing resins may be measured by Differential Scanning calorimetry (DSC) in accordance with ASTM D3418 (1999). In particular embodiments, useful resins may be have a glass transition temperature that is at least 25° C. or alternatively, at least 40° C. or at least 60° C. or between 25° C. and 95° C., between 40° C. and 85° C. or between 60° C. and 80° C.

The amount of plasticizing hydrocarbon resin useful in any particular embodiment of the present invention depends upon the particular circumstances and the desired result and may be present in an amount of between 1 phr and 50 phr or alternatively, between 3 phr and 40 phr, between 5 phr and 35 phr, between 5 phr and 30 phr, between 5 phr and 20 phr or between 5 phr and 15 phr of hydrocarbon resin. As noted above, since both a plasticizing liquid and a plasticizing hydrocarbon resin are included in the plasticizing system, the amount of both types of plasticizers are adjusted as described below to obtain the desired physical characteristics of the tread to improve both the snow traction and braking properties.

The amount of the plasticizing system is adjusted to provide the rubber composition with a glass transition temperature of between −35° C. and −15° C. or alternatively between −30° C. and −20° C. It is also adjusted to provide a dynamic complex shear modulus G* at 60° C. of between 0.9 MPa and 1.4 MPa or alternatively between 0.9 MPa and 1.35 MPa, between 0.9 MPa and 1.3 MPa,2 both measured in accordance with ASTM D5992-96. As such, the ratio of the amount of liquid plasticizer (phr) to the amount of plasticizing resin (phr) may be adjusted to achieve the desired physical properties of the rubber composition so that the surprising break in the compromises achieved. Such ratios may range from between 0.5 and 1.5 or alternatively between 0.6 and 1.4, between 0.5 and 1, between 0.5 and 0.9 or between 0.6 and 0.8.

The rubber compositions disclosed herein are suitable for use in the manufacture of treads and as known to one skilled in the art, the Tg of the cured rubber composition may be adjusted to provide a tread for a tire that is more suitable for a given season. As such the Tg of the rubber compositions may be adjusted around the broad range mentioned above using the plasticizers disclosed to provide a Tg of between −35° C. and −15 for all-season tires. Particular embodiments of the rubber compositions and tire treads disclosed herein are particularly useful for and therefore limited to all-season tires.

In addition to the rubber components and the plasticizing system described above, the rubber compositions suitable for the tire treads disclosed herein may further include a silica reinforcing filler. Reinforcing fillers are used extensively in tires to provide desirable characteristics such as tear strength, modulus and wear. The silica may be any reinforcing silica known to one having ordinary skill in the art, in particular any precipitated or pyrogenic silica having a BET surface area and a specific CTAB surface area both of which are less than 450 $m^2/g$ or alternatively, between 30 and 400 $m^2/g$. Particular embodiments include a silica having a CTAB of between 80 and 200 $m^2/g$, between 100 and 190 m²/g, between 120 and 190 m²/g or between 140 and 180 m²/g. The CTAB specific surface area is the external surface area determined in accordance with Standard AFNOR-NFT-45007 of November 1987.

Particular embodiments of the rubber compositions used in the tire treads of the passenger and light truck vehicles have a BET surface area of between 60 and 250 m²/g or alternatively, of between 80 and 200 m²/g. The BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987).

The silica used in particular embodiments may be further characterized as having a dibutylphthlate (DHP) absorption value of between 100 and 300 ml/100 g or alternatively between 150 and 250 ml/100 g.

Highly dispersible precipitated silicas (referred to as "HD") are used exclusively in particular embodiments of the disclosed rubber composition, wherein "highly dispersible silica" is understood to mean any silica having a substantial ability to disagglomerate and to disperse in an elastomeric matrix. Such determinations may be observed in known manner by electron or optical microscopy on thin sections. Examples of known highly dispersible silicas include, for example, Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 or 8745 from Huber.

Particular embodiments of the present invention include little or no carbon black or other reinforcement fillers. For those embodiments that include adding a silane coupling agent that is commercially available on a carbon black substrate, up to about 50 wt % of the commercial coupling agent weight is carbon black. The rubber compositions having such amounts of carbon black may be characterized as having essentially no carbon black. Some embodiments may include up to 10 phr, or up to 5 phr of carbon black just to provide a typical black coloring of the rubber composition.

The amount of silica added to the rubber composition disclosed herein is between 45 phr and 95 phr or alternatively between 45 phr and 80 phr, between 45 phr and 70 phr, between 45 phr and 60 phr or between 50 phr and 60 phr.

In addition to the silica added to the rubber composition, a proportional amount of a silane coupling agent is also added to the rubber composition. Such coupling agent is added, for example, at between 5% and 10% of the total amount of silica. The silane coupling agent is a sulfur-containing organosilicon compound that reacts with the silanol groups of the silica during mixing and with the elastomers during vulcanization to provide improved properties of the cured rubber composition. A suitable coupling agent is one that is capable of establishing a sufficient chemical and/or physical bond between the inorganic filler and the diene elastomer, which is at least bifunctional, having, for example, the simplified general formula "Y-T-X", in which: Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica); X represents a functional group ("X" function) which is capable of bonding physically and/or chemically with the diene elastomer, for example by means of a sulfur atom; T represents a divalent organic group making it possible to link Y and X.

Examples of suitable sulfur-containing organosilicon silane coupling agents include 3,3'-bis(triethoxysilylpropyl) disulfide and 3,3'-bis(triethoxy-silylpropyl) tetrasulfide. Both of these are available commercially from Degussa as X75-S and X50-S respectively, though not in pure form. Both of these commercially available products include the active component mixed 50-50 by weight with a N330 carbon black. Other examples of suitable silane coupling agents include 2,2'-bis(triethoxysilylethyel)tetrasulfide, 3,3'-bis(tri-t-butoxy-silylpropyl)disulfide and 3,3'-bis(di t-butyl-methoxysilylpropyl)tetrasulfide. Examples of silane coupling agents having just one silicon atom in the silane molecule include, for example, 3,3'(triethoxysilylpropyl) disulfide and 3,3'(triethoxy-silylpropyl)tetrasulfide.

The rubber compositions disclosed herein may be cured with any suitable curing system including a peroxide curing system or a sulfur curing system. Particular embodiments are cured with a sulfur curing system that includes free sulfur and may further include, for example, one or more of accelerators, stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.5 phr and 10 phr or alternatively between 0.5 phr and 5 phr or between 0.5 phr and 3 phr. Particular embodiments may include no free sulfur added in the curing system but instead include sulfur donors.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators.

Particular embodiments may include as a secondary accelerant the use of a moderately fast accelerator such as, for example, diphenylguanidine (DPG), triphenyl guanidine (TPG), diorthotolyl guanidine (DOTG), o-tolylbigaunide (OTBG) or hexamethylene tetramine (HMTA). Such accelerators may be added in an amount of up to 4 phr, between 0.5 and 3 phr, between 0.5 and 2.5 phr or between 1 and 2 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 1 phr and 5 phr.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 10 minutes) and at a sufficiently low temperature lower than the vulcanization temperature of the mixture, so as to protect against premature vulcanization.

The rubber composition can be formed into useful articles, including treads for use on vehicle tires. The treads may be formed as tread bands and then later made a part of a tire or they be formed directly onto a tire carcass by, for example, extrusion and then cured in a mold. As such, tread bands may be cured before being disposed on a tire carcass or they may be cured after being disposed on the tire carcass. Typically a tire tread is cured in a known manner in a mold that molds the tread elements into the tread, including, e.g., the sipes molded into the tread blocks.

It is recognized that treads may be formed from only one rubber composition or in two or more layers of differing rubber compositions, e.g., a cap and base construction. In a cap and base construction, the cap portion of the tread is made of one rubber composition that is designed for contact with the road. The cap is supported on the base portion of the tread, the base portion made of a different rubber composition. In particular embodiments of the present invention the entire tread may be made from the rubber compositions as disclosed herein while in other embodiments only the cap portions of the tread may be made from such rubber compositions.

It is recognized that the contact surface of a tread block, i.e., that portion of the tread block that contacts the road, may be formed totally from the rubber composition having the low Tg as disclosed herein, may be formed totally from another rubber composition or may be formed as combinations thereof. For example, a tread block may be formed as a composite of layered rubber compositions such that half of the block laterally is a layer of the low Tg rubber composition and the other half of the block laterally is a layer of an alternative rubber composition. Such construction would provide a tread block having 80 percent of its contact surface formed of the low Tg rubber composition.

As such, in particular embodiments of the present invention, at least 80 percent of the total contact surface of all the tread blocks on a tread may be formed from the rubber composition having the low Tg as disclosed herein. Alternatively, at least 90 percent, at least 95 percent or 100 percent of the total contact surface of all the tread blocks on a tread may be formed from such rubber composition.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the present invention.

Modulus of elongation (MPa) was measured at 300% (MA300) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Wet braking for a tire mounted on an automobile fitted with an ABS braking system was determined by measuring the distance necessary to go from 50 MPH to 0 MPH upon sudden braking on wetted ground (asphalt concrete). A value greater than that of the control, which is arbitrarily set to 100, indicates an improved result, that is to say a shorter braking distance.

Dry braking of a tire mounted on an automobile fitted with an ABS braking system was measured by determining the distance necessary to go from 60 mph to a complete stop upon sudden braking on a dry asphalt surface. A value greater than that of the control, which is arbitrarily set to 100, indicates an improved result, i.e., a shorter braking distance and improved dry grip.

The rolling resistance of each of the tires tested was measured by running on a test drum, at an ambient temperature of 25° C., in accordance with ISO 8767 (1992).

The maximum tan delta dynamic properties for the rubber compositions were measured at 23° C. on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress at a frequency of 10 Hz under a controlled temperature of 23° C. Scanning was effected at an amplitude of deformation of 0.05 to 50% (outward cycle) and then of 50% to 0.05% (return cycle). The maximum value of the tangent of the loss angle tan delta (max tan δ) was determined during the return cycle.

Wear resistance of a tire mounted on an automobile was measured by subjecting the tire to actual on-road travel and measuring its wear rate (mm of tread lost per 1000 miles) at between 10,000 and 12,000 miles traveled. A value greater than that of the control, arbitrarily set to 100, indicates an improved result, that is to say less wear rate.

Snow grip (%) on snow-covered ground was evaluated by measuring the forces on a single driven test tire in snow according to the ASTM F1805 test method. The vehicle travels at a constant 5 mph speed and the forces are measured on the single test tire at the target slip. A value greater than that of the Standard Reference Test Tire (SRTT), which is arbitrarily set to 100, indicates an improved result, i.e., improved grip on snow.

Dynamic properties (Tg and G*) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −60° C. to 100° C. with the temperature increasing at a rate of 1.5° C./min. The shear modulus G* at 60° C. was captured and the temperature at which the max tan delta occurred was recorded as the glass transition temperature, Tg.

Example 1

Rubber compositions were prepared using the components shown in Table 1. The amount of each component making up the rubber compositions shown in Table 1 are provided in parts her hundred parts of rubber by weight (phr). The microstructures and glass transition temperatures of each functionalized SBR is also provided in Table 1. The BR had a cis content of 98 mol %, a vinyl content of 0.5 mol % and a Tg of −108° C. The SBR had a styrene content of 26 wt %, a vinyl content of 24 mol % and a Tg of −48° C.

TABLE 1

Rubber Formulations

| Formulation | W1 | F1 | F2 | F3 | F4 |
|---|---|---|---|---|---|
| Natural Rubber | 17 | | | | |
| BR | 20 | | 20 | | |
| SBR | | | | 20 | |
| fSBR | 63 | | | | |
| Tg, ° C. | −24 | | | | |
| Styrene, wt. % | 25 | | | | |
| Vinyl, mol. % | 58 | | | | |
| fSBR | | 100 | 80 | 100 | 80 |
| Tg, ° C. | | −48 | | | |
| Styrene, wt. % | | 28 | | | |
| Vinyl, mol. % | | 24 | | | |
| N234 | 4 | 4 | 4 | 4 | 4 |
| Silica | 58 | 82 | 90 | 51 | 51 |
| Coupling Agent | 5 | 8 | 9 | 5 | 5 |
| Oil | 13 | 23 | 24 | 6 | 6 |
| Resin | | 19 | 29 | 8 | 8 |
| Additives | 5 | 6 | 7 | 5 | 5 |
| Cure Package | 9 | 7 | 7 | 7 | 7 |

The resin was a $C_5C_9$ resin with a glass transition temperature of 53° C. The oil for the witness composition W1 was a naphthenic oil and for the example compositions F1-F4 was AGRI-PURE 80. The silica was ZEOSIL 160, a highly dispersible silica available from Rhodia having a BET of 160 $m^2/g$. The silane coupling agent was X 50-S available from Evonik Degussa. The curative package included sulfur, accelerators, zinc oxide and stearic acid and the additives included antidegradants and wax.

For each of the formulations described in Table 1, the rubber components and all the other materials except for the cure package were added to a Bandury mixer and processed until well incorporated. The mixture was then dropped from the mixer, transferred to a mill and cooled.

The cure package was added to the cooled mixture on the mill and the productive mix was milled for a time until the components were well mixed. The product was then tested for its properties in accordance with the testing procedures described above. The results of such testing are provided in Table 2.

TABLE 2

Properties

| | W1 | F1 | F2 | F3 | F4 |
|---|---|---|---|---|---|
| Physical Properties | | | | | |
| MA300 @ 23° C. (MPa) | 2.9 | 1.7 | 1.5 | 2.4 | 2.3 |
| Modulus G* @ 60° C. | 1.6 | 1.1 | 1.0 | 1.3 | 1.3 |
| Max Tan Delta @ 23° C. | 0.21 | 0.20 | 0.23 | 0.14 | 0.15 |
| Tg, ° C. | −20.1 | −26.3 | −25.5 | −26.1 | −26.0 |

Tires were manufactured with treads made from the formulations of Table 1. The results of the tire testing are provided in Table 3.

TABLE 3

Tire Results

| | W1 | F1 | F2 | F3 | F4 |
|---|---|---|---|---|---|
| Tire Results | | | | | |
| Wet Traction | 100 | 115 | 114 | 100 | 100 |
| Dry Traction | 100 | 104 | 105 | 100 | 99 |
| Rolling Resistance | 100 | 94 | 90 | 107 | 105 |
| Snow Grip, % | 100 | 101 | 103 | 108 | 107 |
| Wear | 100 | 98 | 105 | 107 | 113 |

The improvements of the tire results are obvious with improvements shown in wet traction, dry traction and rolling resistance as well as snow grip and wear. The better results were achieved with the lower silica loading and lower plasticizer loading if improved rolling resistance is important without loss of wet or dry traction and improvement in snow grip and wear. Breaking a compromise is a surprising result and the compromise that has been broken here is the improved rolling resistance while maintaining wet/dry/snow traction and wear performance.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A tread for a tire, the tread comprising a rubber composition that is based upon a cross-linkable elastomer composition, the cross-linkable elastomer composition comprising, per 100 parts by weight of rubber (phr):
   greater than 85 phr of a styrene-butadiene elastomer modified with a functional group that is capable of interacting with a silica reinforcing filler and having a glass transition temperature of between greater than −50° C. and less than or equal to −40° C. [[−60° C. and less than −40° C.]];
   between 0 phr and less than 15 phr of an additional highly unsaturated diene elastomer;
   an effective amount of a plasticizing system that includes 3 phr and 40 phr of a plasticizing resin having a glass transition temperature (Tg) of at least 25° C. and a plasticizing liquid, wherein the effective amount of the plasticizing system provides the rubber composition with a shear modulus G* measured at 60° C. of between 0.9 MPa and 1.5 MPa and a Tg of between −35° C. and −15° C.;
   between 45 phr and 95 phr of a silica reinforcing filler; and
   a curing system.

2. The tread of claim 1, wherein the cross-linkable elastomer composition comprises 100 phr of the styrene-butadiene elastomer.

3. The tread of claim 1, wherein the butadiene portion of the styrene-butadiene elastomer has a vinyl-1,2 content of less than 35%.

4. The tread of claim 3, wherein the butadiene portion of the styrene-butadiene elastomer has a vinyl-1,2 content of less than 30%.

5. The tread of claim 1, wherein the styrene-butadiene elastomer has a glass transition temperature of between greater than −50° C. and less than or equal to −45° C.

6. The tread of claim 1, wherein the cross-linkable elastomer composition includes between 45 phr and 70 phr of the silica reinforcing filler.

7. The tread of claim 1, wherein the cross-linkable elastomer composition includes between 5 phr and 30 phr of the plasticizing resin.

8. The tread of claim 7, wherein the cross-linkable elastomer composition includes between 5 phr and 20 phr of the plasticizing resin.

9. The tread of claim 1, wherein a ratio of the plasticizing liquid to the plasticizing resin is between 0.5 and 1.5.

10. The tread of claim 9, wherein the ratio is between 0.5 and 1.

11. The tread of claim 1, wherein the cross-linkable elastomer composition includes between 1 phr and 40 phr of the plasticizing liquid.

12. The tread of claim 11, wherein the cross-linkable elastomer composition includes between 3 phr and 20 phr of the plasticizing liquid.

13. A tire having the tread of claim 1.

14. A tread for a tire, the tread comprising a rubber composition that is based upon a cross-linkable elastomer composition, the cross-linkable elastomer composition comprising, per 100 parts by weight of rubber (phr):
   greater than 85 phr of a styrene-butadiene elastomer modified with a functional group that is capable of interacting with a silica reinforcing filler and having a glass transition temperature of between −60° C. and less than −40° C.;
   between 45 phr and 70 phr of the silica reinforcing filler;
   between 0 phr and less than 15 phr of an additional highly unsaturated diene elastomer;
   an effective amount of a plasticizing system that includes 3 phr and 40 phr of a plasticizing resin having a glass transition temperature (Tg) of at least 25° C. and a plasticizing liquid, wherein the effective amount of the plasticizing system provides the rubber composition with a shear modulus G* measured at 60° C. of between 0.9 MPa and 1.5 MPa and a Tg of between −35° C. and −15° C.;
   between 45 phr and 95 phr of a silica reinforcing filler; and
   a curing system.

15. The tread of claim 14, wherein the cross-linkable elastomer composition comprises 100 phr of the styrene-butadiene elastomer.

16. The tread of claim 14, wherein the butadiene portion of the styrene-butadiene elastomer has a vinyl-1,2 content of less than 35%.

17. The tread of claim 16, wherein the butadiene portion of the styrene-butadiene elastomer has a vinyl-1,2 content of less than 30%.

18. The tread of claim 14, wherein the cross-linkable elastomer composition includes between 5 phr and 30 phr of the plasticizing resin.

19. The tread of claim 18, wherein the cross-linkable elastomer composition includes between 5 phr and 20 phr of the plasticizing resin.

20. The tread of claim 14, wherein a ratio of the plasticizing liquid to the plasticizing resin is between 0.5 and 1.5.

* * * * *